United States Patent
Okamoto et al.

(10) Patent No.: US 10,120,177 B2
(45) Date of Patent: Nov. 6, 2018

(54) OPTICAL CHARACTERISTIC MEASUREMENT APPARATUS AND OPTICAL SYSTEM

(71) Applicant: Otsuka Electronics Co., Ltd., Osaka (JP)

(72) Inventors: Sota Okamoto, Koka (JP); Hiroyuki Sano, Omihachiman (JP)

(73) Assignee: Otsuka Electronics Co., Ltd., Osaka (JP)

( * ) Notice: Subject to any disclaimer, the term of this patent is extended or adjusted under 35 U.S.C. 154(b) by 0 days.

(21) Appl. No.: 15/363,473

(22) Filed: Nov. 29, 2016

(65) Prior Publication Data

US 2017/0184833 A1    Jun. 29, 2017

(30) Foreign Application Priority Data

Dec. 25, 2015 (JP) ................. 2015-253670

(51) Int. Cl.
| G01J 3/00 | (2006.01) |
|---|---|
| G02B 21/24 | (2006.01) |
| G01J 3/02 | (2006.01) |
| G02B 21/06 | (2006.01) |
| G02B 21/36 | (2006.01) |

(52) U.S. Cl.
CPC .......... *G02B 21/244* (2013.01); *G01J 3/0208* (2013.01); *G01J 3/0237* (2013.01); *G02B 21/06* (2013.01); *G02B 21/361* (2013.01)

(58) Field of Classification Search
CPC ........ G02B 21/00; G02B 21/06; G02B 21/12; G02B 21/24; G02B 21/36; G02B 21/244; G02B 21/361; G02B 17/08; G02B 17/0812; G01J 3/00; G01J 3/02; G01J 3/30; G01J 3/0208; G01J 3/0237; H04K 1/00; G11B 7/1353; G11B 7/1381; G11B 7/137; G01M 11/005
See application file for complete search history.

(56) References Cited

U.S. PATENT DOCUMENTS

| 2005/0270611 | A1* | 12/2005 | Oshiro | G02B 21/244 713/186 |
|---|---|---|---|---|
| 2008/0285026 | A1* | 11/2008 | Okawauchi | G01M 11/005 356/300 |
| 2012/0281516 | A1* | 11/2012 | Jung | G11B 7/1353 369/103 |
| 2013/0314679 | A1* | 11/2013 | Omura | G02B 17/0812 355/66 |

FOREIGN PATENT DOCUMENTS

| JP | H11-249027 A | 9/1999 |
|---|---|---|
| JP | 2008-286583 A | 11/2008 |

* cited by examiner

*Primary Examiner* — Jamil Ahmed
(74) *Attorney, Agent, or Firm* — Studebaker & Brackett PC

(57) ABSTRACT

An optical characteristic measurement apparatus which can be reduced in size and can achieve enhanced versatility is provided. The optical characteristic measurement apparatus includes a first optical element which converts measurement light from a measurement target object to parallel light, a reflective lens which reflects the parallel light from the first optical element to convert the parallel light to convergent light, a light reception portion which receives the convergent light from the reflective lens, and a drive mechanism which varies a position of the first optical element relative to the measurement target object.

7 Claims, 18 Drawing Sheets

OPTICAL CHARACTERISTIC MEASUREMENT APPARATUS AND OPTICAL SYSTEM

BACKGROUND OF THE INVENTION

Field of the Invention

The present technology relates to an optical characteristic measurement apparatus which measures optical characteristics of a measurement target object and an optical system included therein.

Description of the Background Art

A microspectroscope has been known as one example of an optical characteristic measurement apparatus which measures optical characteristics of a measurement target object. The microspectroscope outputs optical characteristics such as a reflectance, an index of refraction, a coefficient of extinction, and a thickness of the measurement target object by subjecting light from any measurement target object to spectroscopy. Japanese Patent Laying-Open No. 2008-286583 discloses as one example of the microspectroscope, an optical characteristic measurement apparatus with improved accuracy in measurement of optical characteristics, in which focusing on a measurement target object can more readily be achieved.

The optical characteristic measurement apparatus disclosed in Japanese Patent Laying-Open No. 2008-286583 has a structure of a microscope of a type referred to as a finite tube. In contrast, a structure of a microscope referred to as an infinite tube type has been known. Japanese Patent Laying-Open No. 11-249027 discloses an autofocus microscope which can automatically adjust a position of focus on an observed sample as a configuration adopting such an infinite tube type microscope.

SUMMARY OF THE INVENTION

Possible applications of the autofocus microscope disclosed in Japanese Patent Laying-Open No. 11-249027 include observation of a small material or video shooting of an observed image, and the autofocus microscope cannot be made use of as it is as an optical characteristic measurement apparatus required to measure optical characteristics in an infrared band and an ultraviolet band in addition to a visible light band.

An object of the present technology is to provide an optical characteristic measurement apparatus which can be reduced in size and can achieve enhanced versatility.

An optical characteristic measurement apparatus according to one aspect of the present invention includes a first optical element which converts measurement light from a measurement target object to parallel light, a reflective lens which reflects the parallel light from the first optical element to convert the parallel light to convergent light, a light reception portion which receives the convergent light from the reflective lens, and a drive mechanism which varies a position of the first optical element relative to the measurement target object.

The optical characteristic measurement apparatus may further include a second optical element which is arranged on an optical path between the first optical element and the reflective lens and reflects the parallel light from the first optical element to vary a direction of propagation the parallel light.

The first optical element may include a set of a convex reflector and a concave reflector which are arranged such that central axes of the reflectors match with an optical axis of the parallel light.

The first optical element may include a curved mirror arranged in correspondence with the reflective lens and a bending mirror combined with the curved mirror.

The light reception portion may output a wavelength spectrum included in light received from the reflective lens.

The optical characteristic measurement apparatus may further include a first light source which produces measurement light for irradiation of the measurement target object and a beam splitter which is arranged on an optical path from the reflective lens to the light reception portion and is optically connected to the first light source.

The optical characteristic measurement apparatus may further include a second light source which produces observation light including at least a visible light band in a wavelength component, and the first light source produces the measurement light including a wavelength component in accordance with optical characteristics to be measured from the measurement target object.

The optical characteristic measurement apparatus may further include an observation portion which observes an image of the measurement light emitted to the measurement target object.

The optical characteristic measurement apparatus may further include a controller which determines a position of the first optical element relative to the measurement target object by driving the drive mechanism based on sharpness of the image observed with the observation portion.

An optical system according to another aspect of the present invention includes a first optical element which converts measurement light from a measurement target object to parallel light, a reflective lens which reflects the parallel light from the first optical element to convert the parallel light to convergent light, and a light reception portion which receives the convergent light from the reflective lens.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
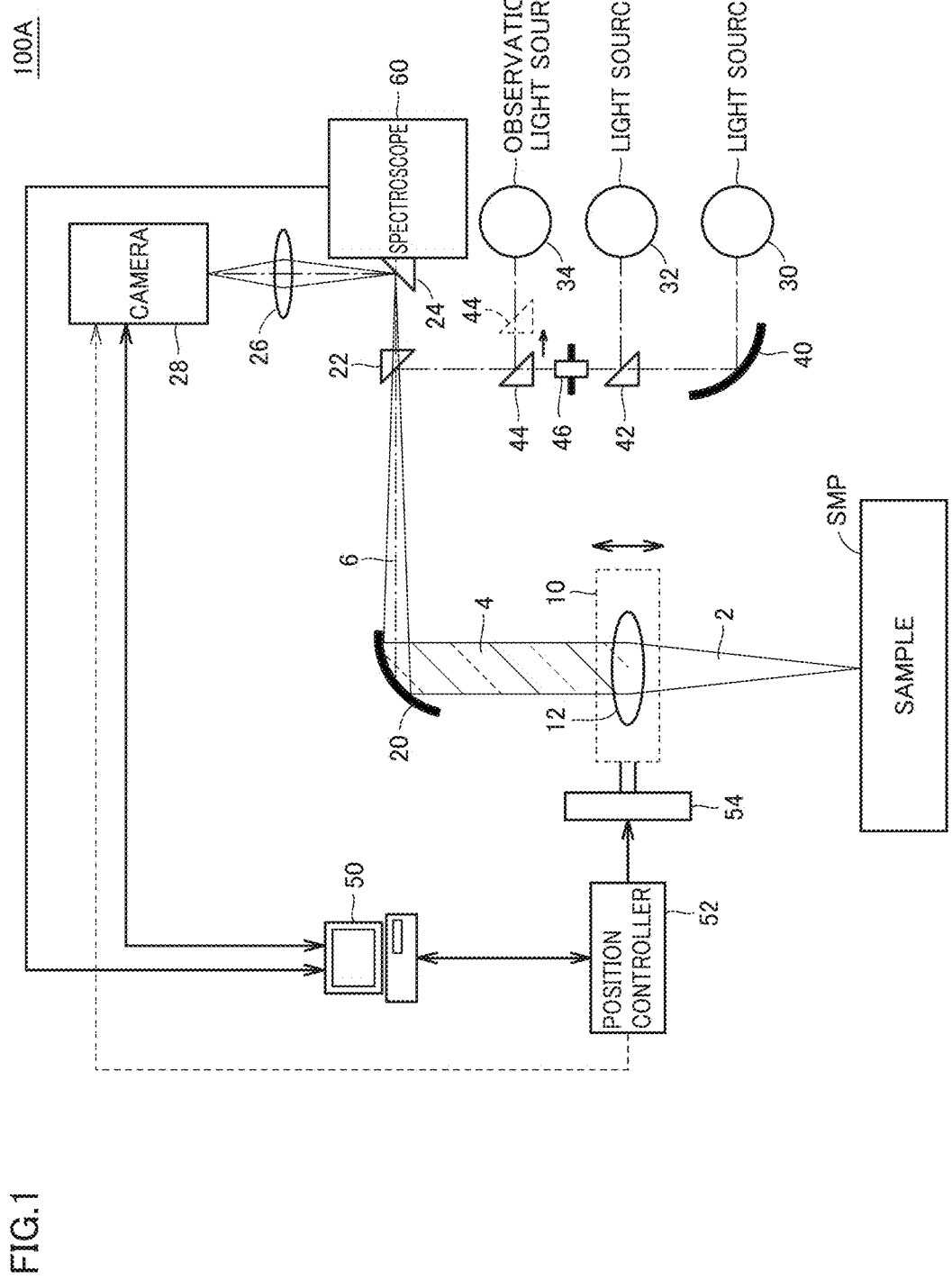
FIG. 1 is a schematic diagram showing an apparatus configuration of a measurement apparatus according to an embodiment.

An embodiment of the present invention will be described in detail with reference to the drawings. The same or corresponding elements in the drawings have the same reference characters allotted and description thereof will not be repeated.

<A. Overview of Configuration>

An overview of a configuration adopted in an optical characteristic measurement apparatus (hereinafter also abbreviated as a "measurement apparatus") according to the present embodiment will initially be described.

The measurement apparatus according to the present embodiment adopts a structure of a microscope of an infinite tube type. A microscope of a finite tube type forms an image of a measurement target object (hereinafter also referred to as a "sample") with the use of one objective lens, whereas a microscope of an infinite tube type forms an image of a sample with the use of a set of an objective lens and an imaging lens. The imaging lens is also referred to as a tube lens. Parallel light focused on infinity propagates between the objective lens and the imaging lens. The set of the objective lens and the imaging lens is also referred to as an infinity corrected optical system.

The microscope of the infinite tube type is more advantageous than a microscope of a finite tube type in that a distance between one set of lenses can freely be designed. For example, the microscope of the infinite tube type is advantageous in that various optical elements such as a half mirror and a filter can be interposed between lenses and distortion such as axis misalignment can be corrected by optimizing positional relation between the lenses.

The measurement apparatus according to the present embodiment implements a microscope of an infinite tube type which can be reduced in size and can achieve enhanced versatility by adopting an optical system constituted of a combination of an optical element which converts sample light from a sample to parallel light and a reflective lens (typically, a curved mirror) which reflects the parallel light from the optical element to convert the parallel light to convergent light. Since the measurement apparatus according to the present embodiment includes the reflective lens for conversion between the parallel light and the convergent light, chromatic aberration which may be caused when a refractive lens is employed can be lessened or avoided, and measurement and observation over a wide wavelength range can be conducted.

Some implementations according to the present embodiment will be described below. Though an apparatus configuration is two-dimensionally depicted for the sake of convenience of illustration in some schematic diagrams described below, arrangement can actually be three-dimensional. By three-dimensionally arranging constituent members, the entire measurement apparatus can be reduced in size.

Representative examples of a sample include a semiconductor substrate, a glass substrate, a sapphire substrate, a quartz substrate, and a film each having a thin film formed thereon (each coated with a thin film). More specifically, the glass substrate having a thin film formed is employed as a part of a flat panel display (FPD) such as a liquid crystal display (LCD) or a plasma display panel (PDP). The sapphire substrate having a thin film formed is employed for a light emitting diode (LED) or a laser diode (LD) based on a nitride semiconductor (gallium nitride GaN). The quartz substrate having a thin film formed is employed for various optical filters, optical components, and projection liquid crystals.

<B. First Embodiment>

An apparatus configuration of a measurement apparatus 100A according to a first embodiment will be described with reference to FIG. 1. Measurement apparatus 100A obtains sample light from a sample SMP and outputs such optical characteristics as a reflectance, an index of refraction, a coefficient of extinction, and a thickness of sample SMP.

Measurement apparatus 100A includes, as features for detecting sample light from sample SMP, a head portion 10 including an objective lens 12, a curved mirror 20, beam splitters 22 and 24, an imaging lens 26, a camera 28, and a spectroscope 60.

Objective lens 12 corresponds to an optical element which converts sample light 2 from sample SMP to parallel light 4. When sample light 2 radiated from sample SMP is incident on objective lens 12, the sample light is emitted as parallel light 4. Any of a reflective lens and a refractive lens can be adopted as objective lens 12. For suppression of occurrence of chromatic aberration, a reflective lens is preferred. Parallel light 4 from objective lens 12 is incident on curved mirror 20 arranged on an optical path.

Curved mirror 20 corresponds to a reflective lens which reflects parallel light 4 from objective lens 12 to convert parallel light 4 to convergent light 6. Curved mirror 20 functions as an imaging lens. A part of convergent light 6 emitted from curved mirror 20 passes through beam splitters 22 and 24 and is incident on spectroscope 60 arranged on the optical path. By differing a direction of propagation at curved mirror 20, the optical path is adjusted such that an optical component making up an optical path for incident light and an optical component making up an optical path for reflected light do not interfere with each other. A spherical mirror or an aspherical mirror may be adopted as curved mirror 20 for conversion to parallel light. By adopting an aspherical mirror, astigmatism can be suppressed and occurrence of image misalignment can be prevented.

Spectroscope 60 corresponds to a light reception portion which receives convergent light 6 (sample light) from curved mirror 20. Spectroscope 60 outputs a wavelength spectrum included in light received from curved mirror 20. More specifically, spectroscope 60 includes diffraction grating for splitting incident light into wavelength components and a detection element (a photodiode array and a charged coupled device (CCD)) for detecting each wavelength component split with the diffraction grating.

Another part of convergent light 6 emitted from curved mirror 20 passes through beam splitter 22, and an optical path through which the convergent light propagates is varied with beam splitter 24. Then, the convergent light passes through imaging lens 26 and is incident on camera 28.

Camera 28 is an image pick-up portion which obtains an observed image resulting from sample light 2 from sample SMP. An image of measurement light emitted to sample SMP is observed. More specifically, camera 28 is configured with a CCD image sensor or a complementary metal oxide semiconductor (CMOS) image sensor. A display for showing an observed image obtained with camera 28 may be provided.

Measurement apparatus 100A further includes a drive mechanism 54 which varies a position of objective lens 12 relative to sample SMP. Drive mechanism 54 is coupled to head portion 10 including objective lens 12 and moves head portion 10 in a direction in parallel to a direction of propagation of parallel light 4. Sample light which propagates between objective lens 12 and curved mirror 20 is parallel light. Therefore, even though a position of objective lens 12 relative to sample SMP is varied with drive mechanism 54, influence thereby on a state of incidence of sample light on spectroscope 60 and camera 28 is ignorable. With variation in position of objective lens 12 relative to sample SMP, a focal position (a position of imaging) of objective lens 12 can be set to any position.

Since it is thus parallel light that propagates between objective lens 12 and curved mirror 20, positions of sample SMP and objective lens 12 can be adjusted while an optical condition is maintained even when a distance of objective lens 12 along the parallel light is varied. Measurement apparatus 100A according to the first embodiment can focus on any position simply by varying a position of head portion 10 relative to sample SMP, and it is not necessary to adopt a large-scale adjustment mechanism even when relatively large sample SMP is measured.

A position controller 52 adjusts a position of objective lens 12 relative to sample SMP based on information on an observed image obtained with camera 28. Position controller 52 gives a position command to drive mechanism 54 based on the information from camera 28. A specific method of adjusting a position will be described later.

Information processing apparatus 50 performs various types of numerical analysis processing (representatively, fitting processing or noise removal processing) based on a result of detection by spectroscope 60 (a wavelength spectrum) and calculates and stores such optical characteristics as a reflectance, an index of refraction, a coefficient of extinction, and a thickness of sample SMP.

It is not necessary to irradiate sample SMP with illumination light when sample SMP is a light emitting element. When optical characteristics of a substrate or the like are measured, however, the substrate or the like should be irradiated with light including a prescribed wavelength component and light reflected therefrom should be obtained as sample light. Measurement light sources 30 and 32, an observation light source 34, a curved mirror 40, a beam splitter 42, and an aperture 46 are included as features for irradiating sample SMP with light.

Measurement light source 30 and measurement light source 32 produce measurement light with which sample SMP is irradiated. Measurement light includes a wavelength component in accordance with optical characteristics to be measured from sample SMP. For example, measurement light source 30 may produce first measurement light including a wavelength component in an infrared band and measurement light source 32 may produce second measurement light including a wavelength component in an ultraviolet band. Measurement light source 30 and measurement light source 32 are implemented, for example, by an arc emission light source such as a deuterium lamp or a xenon lamp, a filament emission light source such as a halogen lamp, or a combination thereof.

It is not necessary to prepare two types of measurement light sources, and only a single measurement light source may be provided. When only a single measurement light source is provided, for example, a white light source may be adopted as the measurement light source and an optical filter which allows passage therethrough of a wavelength component in accordance with optical characteristics to be measured may be combined therewith.

When a reflection spectrum from sample SMP is measured with a microspectroscope such as measurement apparatus 100A according to the present embodiment, any of a state that measurement light is focused on sample SMP or a state that a focusing position of measurement light is sufficiently distant from sample SMP (a state sufficiently out of focus) is preferred, because in any of these states, measurement can suitably be conducted under the least influence by the focus.

When measurement light is focused on sample SMP, an ark emission measurement light source is employed and an image is formed on the aperture with the use of a curved reflective lens. In contrast, when a focusing position of measurement light is sufficiently distant from sample SMP, a filament emission light source is employed and an image is formed with the use of a plane mirror or a half mirror at a position sufficiently out of focus. In order to arbitrarily differ such a focused state, measurement light source 30 and measurement light source 32 may be different in type from each other.

With a conventional configuration in which a refractive lens is adopted, an image has not been formed in a specific state over the entire band covering wide wavelengths, due to the influence by chromatic aberration. With measurement apparatus 100A according to the first embodiment, however, chromatic aberration can be lessened and hence an aimed state of image formation can be realized on any of a long wavelength side and a short wavelength side.

Measurement light produced by measurement light source 30 is reflected by curved mirror 40, passes through beam splitter 42 and aperture 46, and is incident on beam splitter 22. An optical path through which measurement light produced by measurement light source 32 propagates is varied with beam splitter 42, and the measurement light passes through aperture 46 and is incident on beam splitter 22.

An optical path through which measurement light from measurement light source 30 and/or measurement light from measurement light source 32 propagate(s) is varied with beam splitter 22, and the measurement light passes curved mirror 20 and passes through objective lens 12 and is incident on sample SMP. The measurement light propagates through the optical path the same as the optical path of the measurement light from sample SMP in a reverse direction. When both of measurement light source 30 and measurement light source 32 produce measurement light, beam splitter 42 mixes the light.

Beam splitter 22 is arranged on the optical path from curved mirror 20 serving as the reflective lens to spectroscope 60, and optically connected to the light source (measurement light sources 30 and 32).

Aperture 46 adjusts a beam diameter of measurement light from measurement light source 30 and/or measurement light from measurement light source 32.

Aperture 46 adjusts a beam size of measurement light from measurement light source 30 and/or measurement light from measurement light source 32 such that an image of measurement light having a width (a diameter) necessary for obtaining sample light from sample SMP and measuring a spectrum (a reflection spectrum) is formed. When a size of a formed image of measurement light is adjusted to a beam size suitable for measurement of a spectrum, it becomes difficult to observe a field of view necessary for a microscope. Therefore, a configuration capable of emitting observation light for observing sample SMP in a wider field of view in addition to measurement light is adopted.

Specifically, measurement apparatus 100A according to the first embodiment includes an observation light source 34 which produces observation light including at least a visible light band as a wavelength component. Camera 28 may be configured to have detection sensitivity also to observation light. A switching mirror 44 for switching between measurement light narrow in field of view from aperture 46 and observation light wide in field of view may be provided. A mechanism which makes switching as to whether or not to interpose switching mirror 44 in an optical path between beam splitter 22 and aperture 46 is provided. Switching mirror 44 may be driven, for example, by a solenoid actuator.

When switching mirror 44 is interposed in the optical path between beam splitter 22 and aperture 46, an optical path of observation light from observation light source 34 is varied with switching mirror 44 so that the observation light is incident on beam splitter 22. Then, an optical path through which the observation light propagates is varied with beam splitter 22, and the observation light passes curved mirror 20 and passes through objective lens 12 and is incident on sample SMP. Thus, the observation light from observation light source 34 also propagates through the optical path the same as the optical path of the measurement light from sample SMP in a reverse direction.

In a general form of use, initially, a focal position of objective lens 12 on sample SMP is adjusted. In succession, obtainment and measurement of measurement light from sample SMP are started. At the time of first adjustment of the focal position, sample SMP should be irradiated with observation light. Then, switching mirror 44 is arranged on the optical path between aperture 46 and beam splitter 22 so as to guide observation light from observation light source 34 to sample SMP. When adjustment of the focal position is completed, switching mirror 44 is moved to guide measurement light from measurement light source 30 and/or measurement light source 32 to sample SMP. Switching mirror 44 is thus configured to be variable in position along an optical axis of observation light emitted from observation light source 34.

Instead of switching mirror 44, a beam splitter or a half mirror fixed at a prescribed position can also be adopted. By adopting a beam splitter or a half mirror with switching mirror 44 being configured to be interposable or removable, a quantity of measurement light emitted to sample SMP can be increased. It is not necessary to control on/off of observation light source 34 each time measurement is conducted, and measurement light does not interfere with observation of sample SMP.

As will be described later, measurement light is used for focus adjustment and observation light is used for observation of sample SMP. Therefore, even though an observed image resulting from observation light is out of focus, it does not affect image formation of measurement light. Therefore, in measurement with measurement light, sample SMP can more sharply be detected.

Since a reflective lens (curved mirror) is adopted for conversion between convergent light and parallel light in measurement apparatus 100A according to the first embodiment, chromatic aberration caused when using a refractive lens can be avoided. Therefore, a wavelength band in which observation can be conducted is not restricted to the visible light band as in a conventional microscope of a finite tube type. Measurement apparatus 100A according to the present embodiment can be used with influence by chromatic aberration being lessened also in the ultraviolet band and the infrared band in addition to the visible light band. Therefore, optical characteristics can be measured through measurement of a spectrum (typically a reflection spectrum) over a wide wavelength range including the ultraviolet band, the visible light band, and the infrared band and numerical analysis of a measured spectrum.

<C. First Modification of First Embodiment>

Though a configuration in which a refractive lens is employed as objective lens 12 in measurement apparatus 100A according to the first embodiment described above has been exemplified, a reflective objective lens may be employed instead.

An apparatus configuration of a measurement apparatus 100B according to a first modification of the first embodiment will be described with reference to FIG. 2. FIG. 3 shows a configuration example of a reflective objective lens adopted in measurement apparatus 100B shown in FIG. 2.

Figure 2:
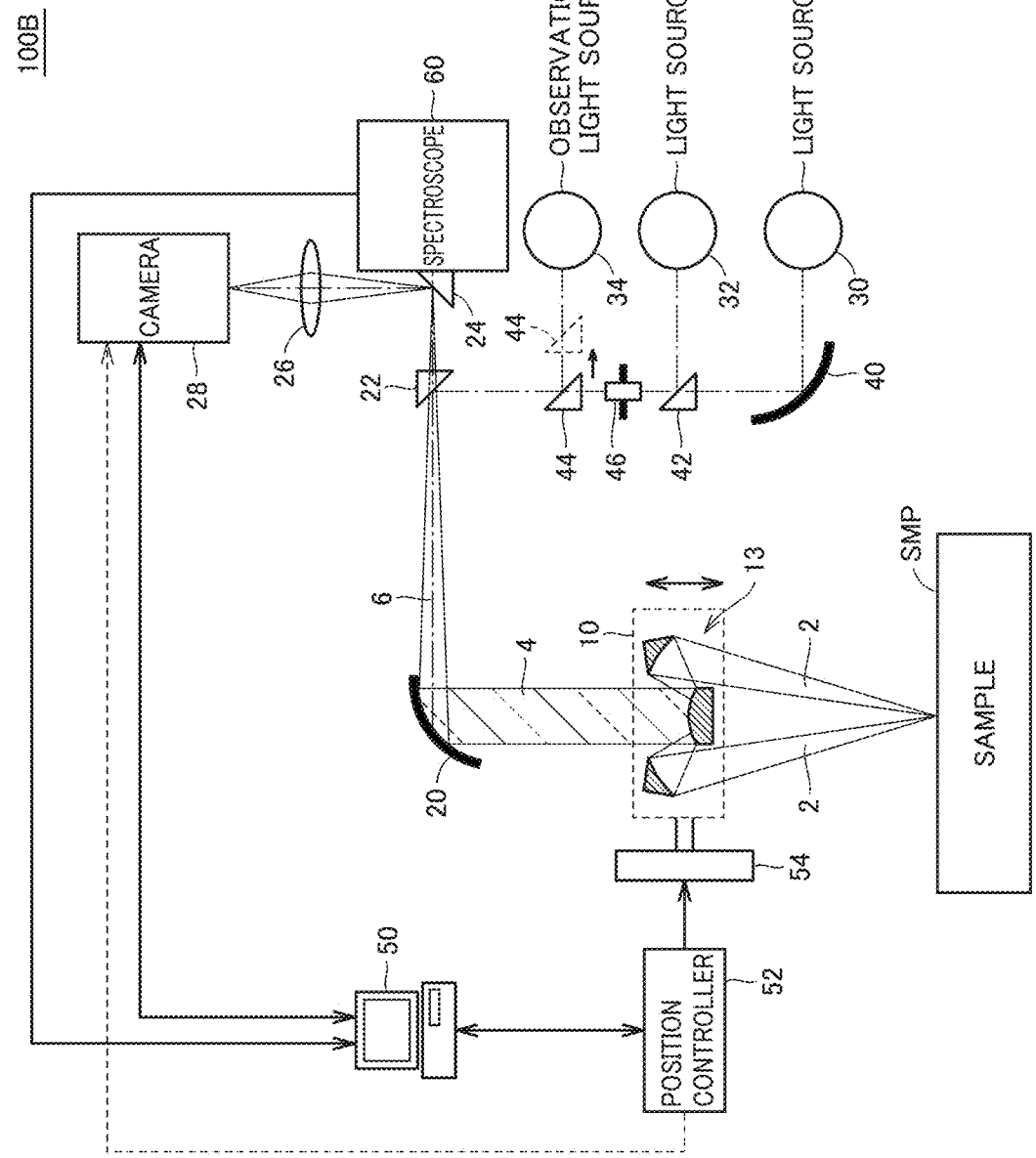
FIG. 2 is a schematic diagram showing an apparatus configuration of a measurement apparatus according to a first modification of the embodiment.
Figure 3:
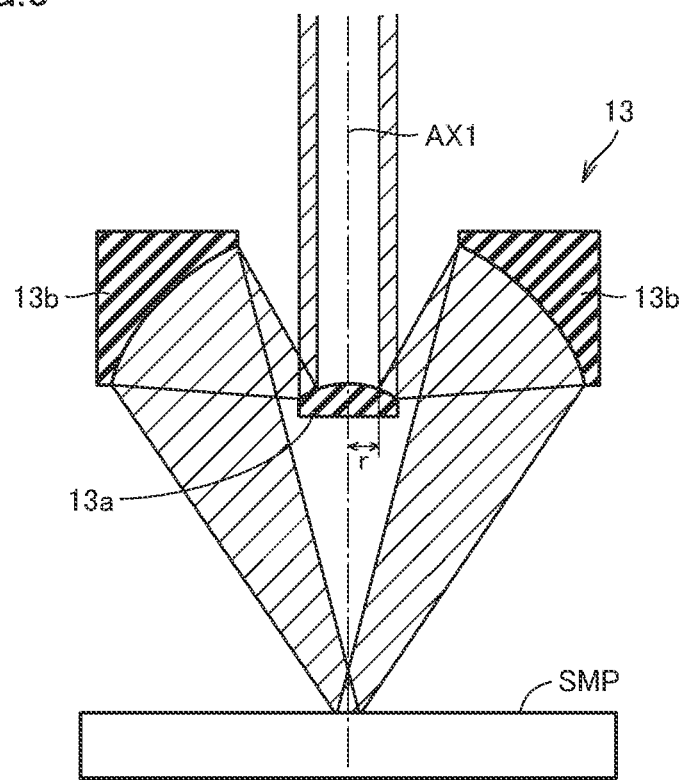
FIG. 3 is a schematic diagram showing a configuration example of a reflective objective lens adopted in the measurement apparatus shown in FIG. 2.

Measurement apparatus 100B shown in FIG. 2 is different from measurement apparatus 100A shown in FIG. 1 in that head portion 10 including a reflective objective lens 13 is adopted. Since the configuration is otherwise the same as in measurement apparatus 100A shown in FIG. 1, detailed description will not be repeated.

Referring to FIGS. 2 and 3, in the first modification of the first embodiment, an example in which a Cassegrainian reflective objective lens 13 is adopted is shown as a typical example. Specifically, reflective objective lens 13 includes a convex reflector 13a and a concave reflector 13b which are combined with each other. By adopting Cassegrainian reflective objective lens 13, not only chromatic aberration in the objective lens does not occur but also a reflective optical system advantageous in high magnification, compactness, and long operating distance can be realized.

Depending on a type of sample SMP, in spite of focusing on a surface of sample SMP, reflected light from a rear surface of sample SMP may appear as stray light, which may degrade accuracy in measurement as in an example in which a thin film having a thickness only of the nanometer order is employed as sample SMP. In such a case, a Cassegrainian reflective objective lens small in depth of focus is preferably employed.

Convex reflector 13a and concave reflector 13b are both arranged such that central axes thereof match with an optical axis AX1. Convex reflector 13a reflects some of measurement light and/or observation light which propagate(s) along optical axis AX1, and guides the reflected light to concave reflector 13b. Concave reflector 13b is a concentric mirror. Concave reflector 13b condenses measurement light and/or observation light reflected by convex reflector 13a on sample SMP. Sample light from sample SMP propagates through an optical path the same as an optical path of incidence thereof in a reverse direction.

More specifically, referring to FIG. 3, in a cross-section orthogonal to optical axis AX1, convex reflector 13a guides to concave reflector 13b, only light incident on a region distant from optical axis AX1 by at least a prescribed radial distance r, of light (measurement light and/or observation light) incident along optical axis AX1. In contrast, light incident on a region extending from optical axis AX1 by less than prescribed radial distance r, in other words, a region in the vicinity of optical axis AX1, is not guided to concave reflector 13b. Sample SMP is irradiated with only measurement light and/or observation light incident on a region distant from optical axis AX1 of convex reflector 13a by at least prescribed radial distance r. Therefore, a cross-section of light beams incident on sample SMP is in a concentric shape (a toroidal shape) of which central portion is masked. By using light having such a concentric beam cross-section, influence by rear-surface reflected light (stray light) produced as a result of reflection at the rear surface of sample SMP can be avoided.

In measurement apparatus 100B according to the first modification of the first embodiment, the optical path from sample SMP to spectroscope 60 is made up by a reflective optical system. Therefore, optical characteristics can be measured through measurement of a spectrum over a wide wavelength range including the ultraviolet band, the visible light band, and the infrared band and numerical analysis of the measured spectrum, substantially without influence by chromatic aberration.

<D. Second Modification of First Embodiment>

Though a configuration in which a Cassegrainian reflective objective lens is adopted in measurement apparatus 100B according to the first modification of the first embodiment described above has been exemplified, a reflective objective lens of another type may be employed.

Figure 4:
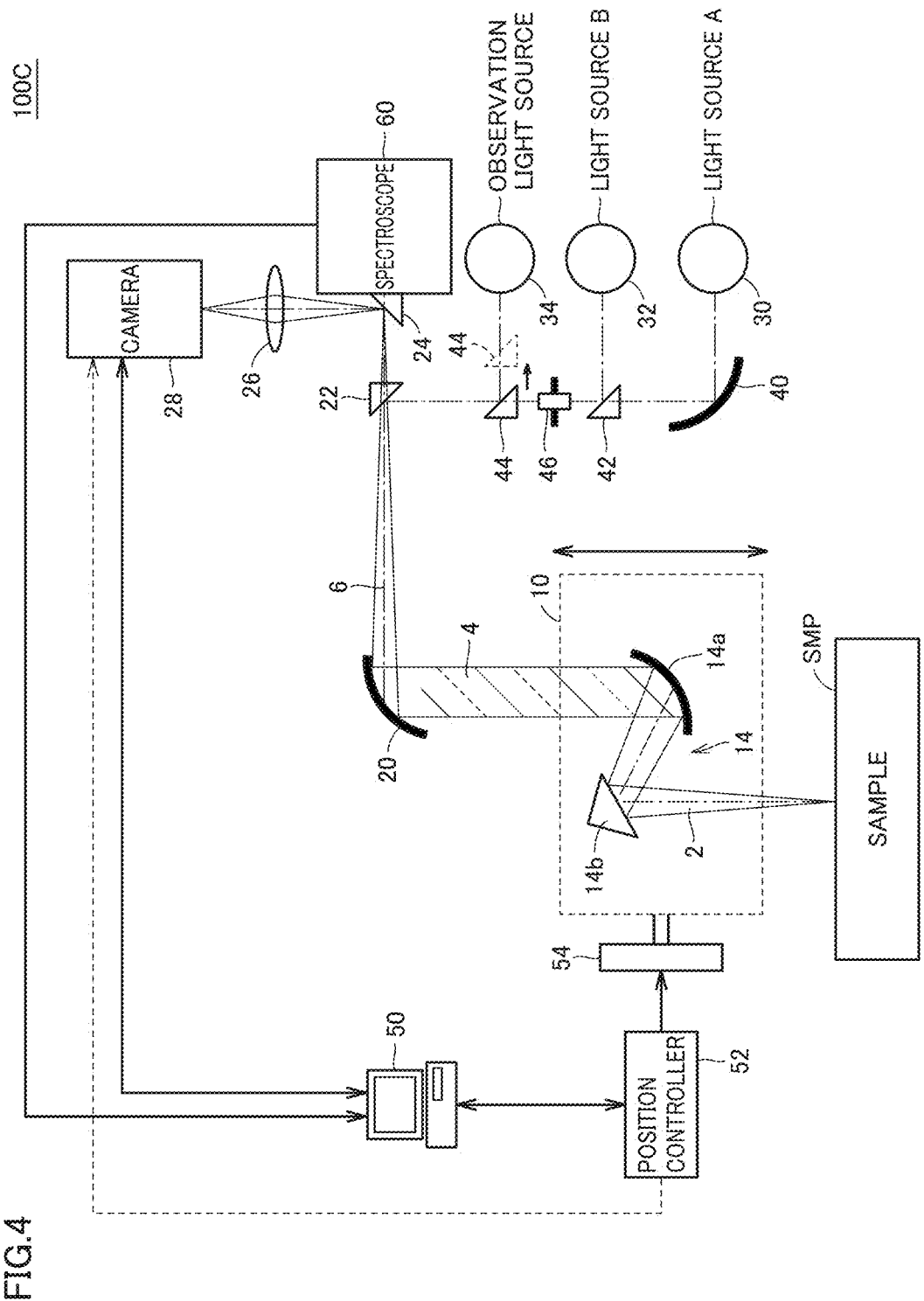
FIG. 4 is a schematic diagram showing an apparatus configuration of a measurement apparatus according to a second modification of a first embodiment.

An apparatus configuration of a measurement apparatus 100C according to a second modification of the first embodiment will be described with reference to FIG. 4. Measurement apparatus 100C shown in FIG. 4 is different from measurement apparatus 100A shown in FIG. 1 in that head portion 10 including a reflective objective lens 14 is adopted. Since the configuration is otherwise the same as in measurement apparatus 100A shown in FIG. 1, detailed description will not be repeated.

More specifically, measurement apparatus 100C according to the second modification of the first embodiment adopts reflective objective lens 14 which is an off-axis reflective objective lens. Reflective objective lens 14 is constituted of a combination of a curved mirror 14a and a bending mirror 14b. Curved mirror 14a is arranged in correspondence with curved mirror 20 and functions as a reflective lens which converts sample light 2 from sample SMP to parallel light by reflecting the sample light. Bending mirror 14b adjusts an optical path such that optical components making up the optical path which are present before and after reflection at curved mirror 14a do not interfere with each other. By adopting such an off-axis reflective objective lens, a reflective optical system of a simplified configuration which is not only free from chromatic aberration at the objective lens but also advantageous in low magnification, long operating distance, and great depth of focus can be realized.

Since the off-axis reflective objective lens is great in depth of focus, the entire sample SMP from a front surface to a rear surface thereof can be focused on. Therefore, the off-axis reflective objective lens can be applicable to sample SMP having a thickness in a wide range from the nanometer order to the micrometer order.

<E. Second Embodiment>

Though a configuration in which objective lens 12 and curved mirror 20 are arranged on the same optical axis in measurement apparatus 100A according to the first embodiment described above has been exemplified, a configuration more suitable for reduction in size may be adopted instead.

Figure 5:
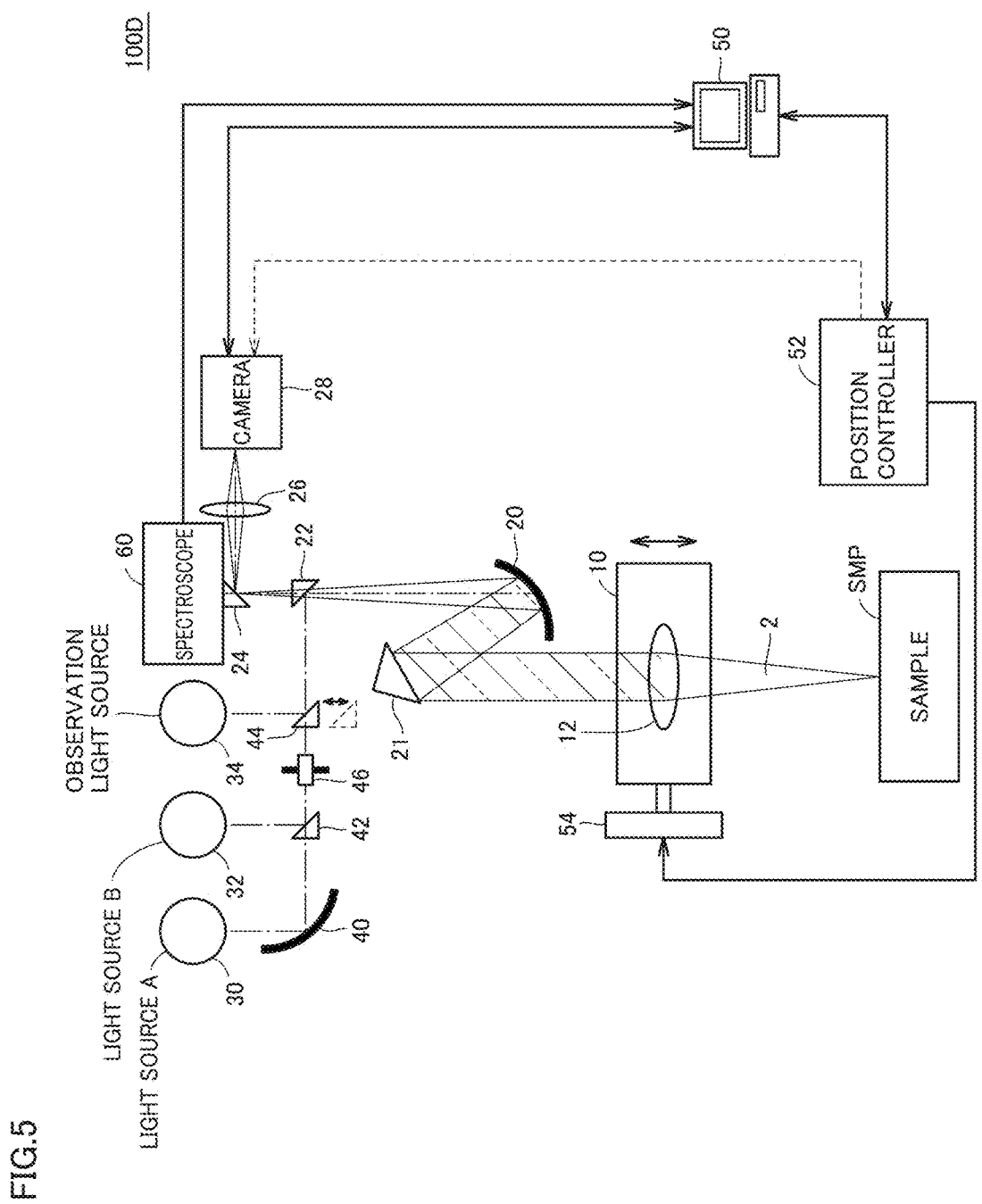
FIG. 5 is a schematic diagram showing an apparatus configuration of a measurement apparatus according to a second embodiment.

An apparatus configuration of a measurement apparatus 100D according to a second embodiment will be described with reference to FIG. 5. Measurement apparatus 100D shown in FIG. 5 is different from measurement apparatus 100A shown in FIG. 1 in that a bending mirror 21 is further arranged on the optical path between objective lens 12 and curved mirror 20. Since the configuration is otherwise the same in function as in measurement apparatus 100A shown in FIG. 1 except for a position of arrangement, detailed description will not be repeated.

Bending mirror 21 reflects the parallel light to vary a direction of propagation of parallel light from objective lens 12. Parallel light incident on bending mirror 21 is reflected by bending mirror 21 as remaining parallel. Therefore, a configuration of an infinite tube type is maintained.

Though FIG. 5 exemplifies a configuration in which a single bending mirror 21 is arranged, a plurality of bending mirrors may be arranged as necessary. In particular, since sample light propagates as parallel light through the optical path from objective lens 12 to curved mirror 20, the number of bending mirrors is not restricted by restriction on a length of the optical path so long as attenuation by reflection at the bending mirror is allowed.

By adopting bending mirror 21 as shown in FIG. 5, positions of arrangement of objective lens 12, curved mirror 20, and spectroscope 60 can more freely be designed. A more appropriate layout can thus be realized depending on applications of measurement apparatus 100D.

<F. First Modification of Second Embodiment>

Figure 6:
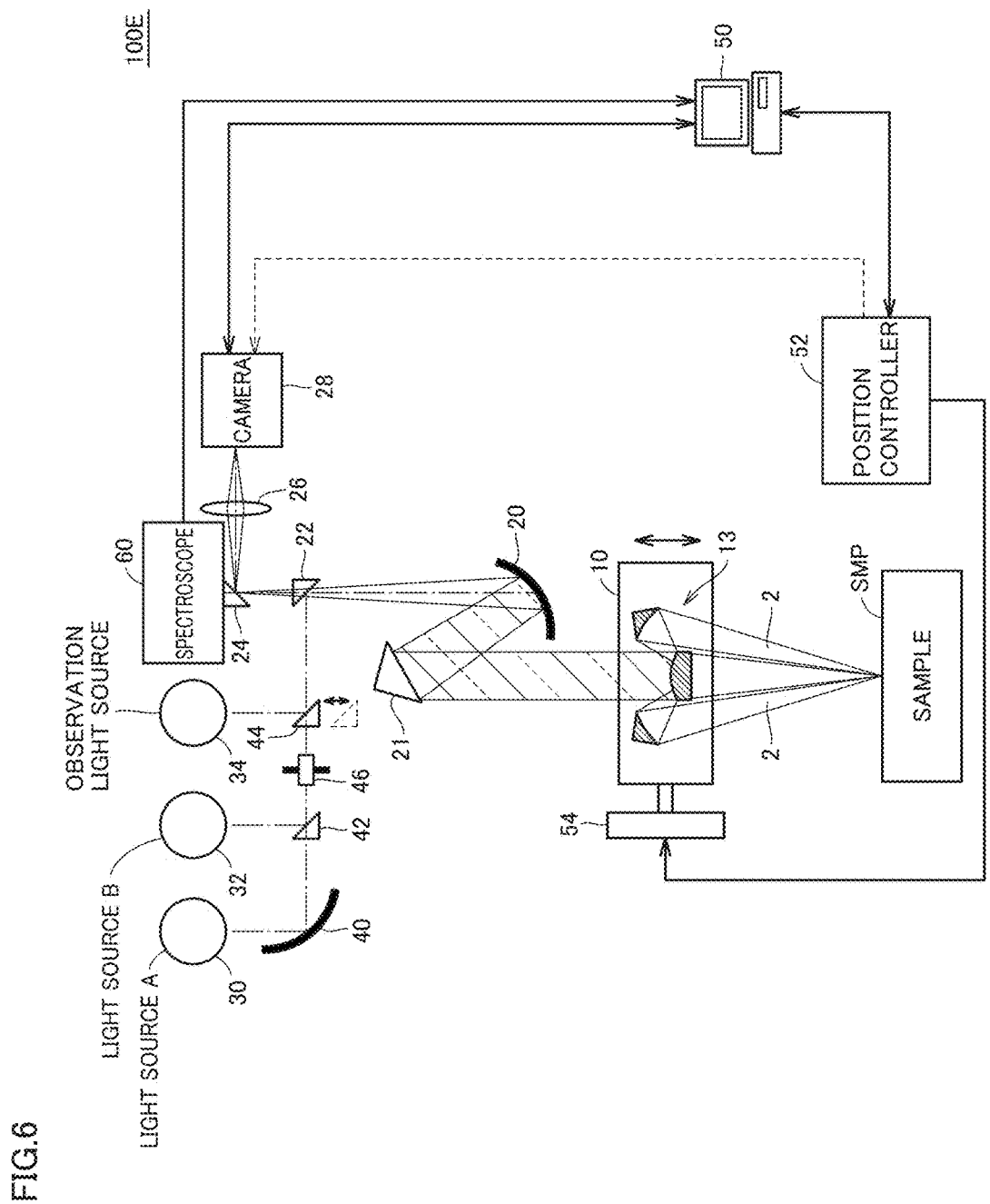
FIG. 6 is a schematic diagram showing an apparatus configuration of a measurement apparatus according to a first modification of the second embodiment.

Though a configuration including a refractive lens as objective lens 12 in measurement apparatus 100D according to the second embodiment described above has been exemplified, a reflective objective lens may be employed instead. An apparatus configuration of a measurement apparatus 100E according to a first modification of the second embodiment will be described with reference to FIG. 6. Measurement apparatus 100E shown in FIG. 6 is different from measurement apparatus 100D shown in FIG. 5 in that head portion 10 including reflective objective lens 13 is adopted. Since the configuration is otherwise the same as in measurement apparatus 100D shown in FIG. 5, detailed description will not be repeated. Since reflective objective lens 13 has been described with reference to FIGS. 2 and 3, detailed description will not be repeated here.

<G. Second Modification of Second Embodiment>

Though a configuration in which a Cassegrainian reflective objective lens is adopted in measurement apparatus 100E according to the first modification of the second embodiment described above has been exemplified, a reflective objective lens of another type may be employed.

Figure 7:
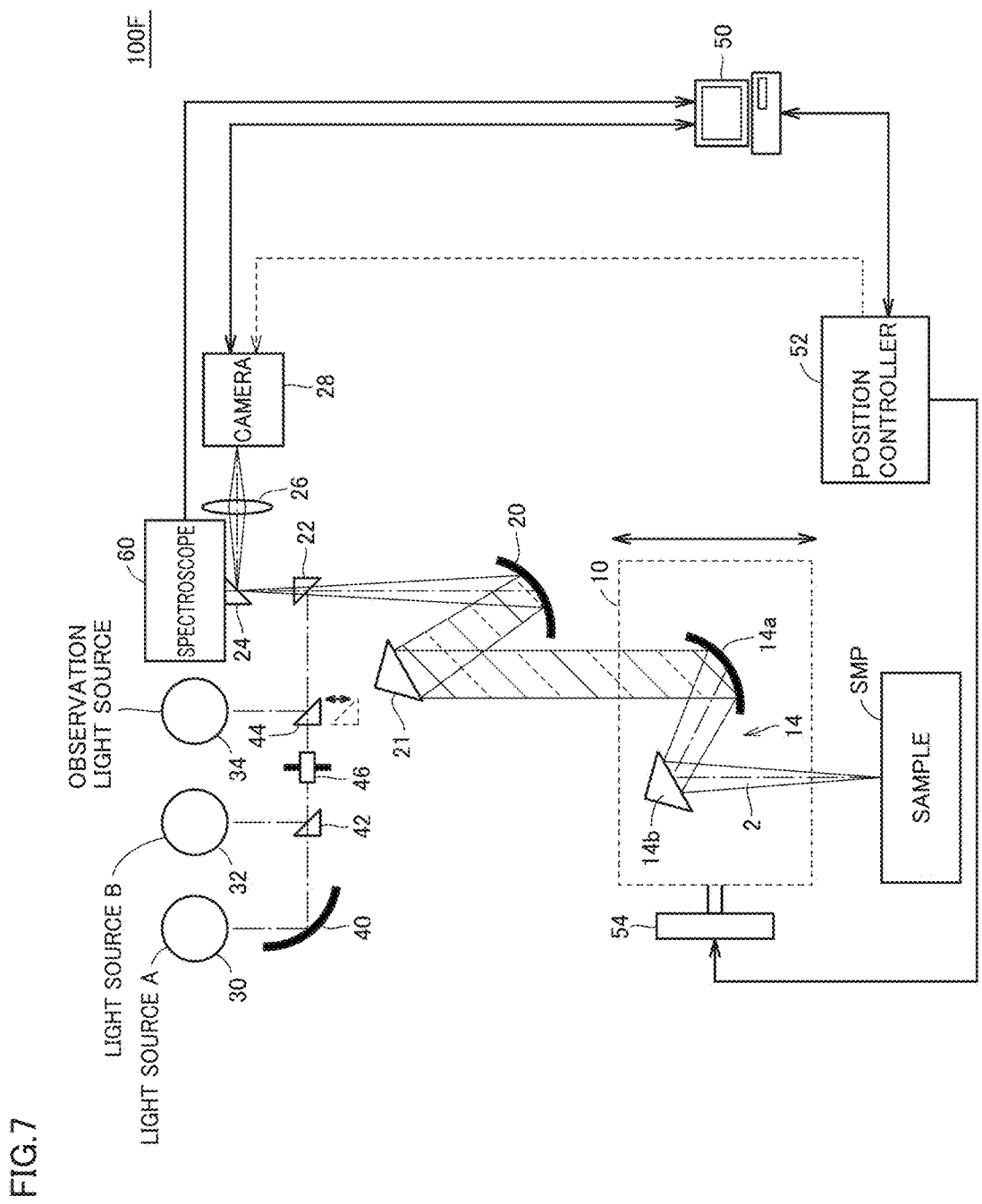
FIG. 7 is a schematic diagram showing an apparatus configuration of a measurement apparatus according to a second modification of the second embodiment.

An apparatus configuration of a measurement apparatus 100F according to a second modification of the second embodiment will be described with reference to FIG. 7. Measurement apparatus 100F shown in FIG. 7 is different from measurement apparatus 100D shown in FIG. 5 in that head portion 10 including reflective objective lens 14 is adopted. Since the configuration is otherwise the same as in measurement apparatus 100D shown in FIG. 5, detailed description will not be repeated. Since reflective objective lens 14 has been described with reference to FIG. 4, detailed description will not be repeated here.

<H. Measurement Procedure>

Figure 8:
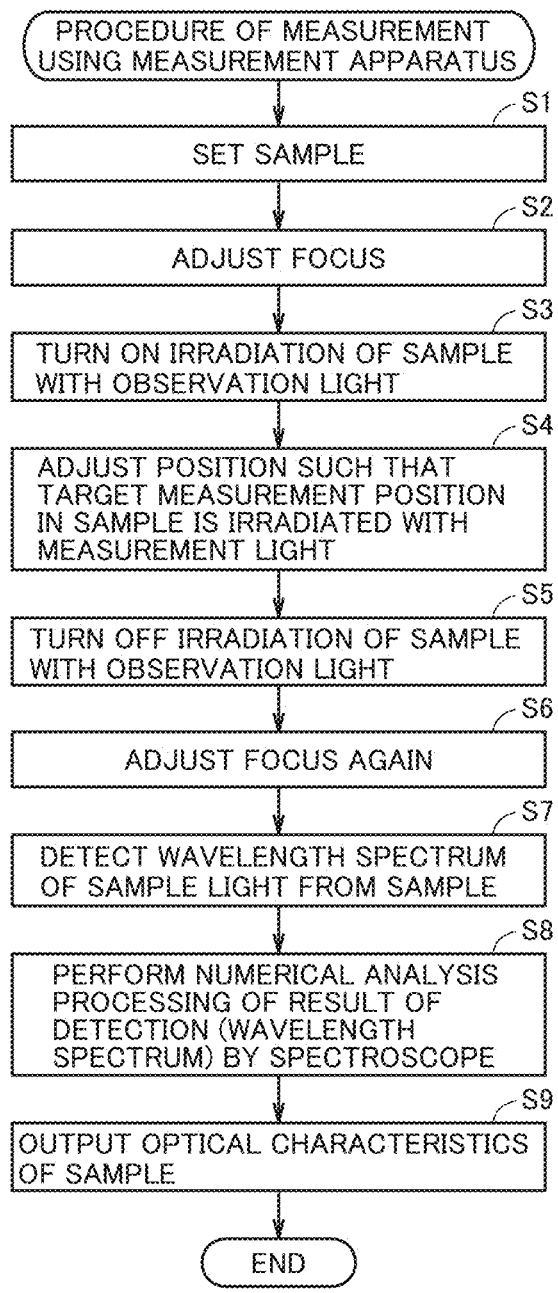
FIG. 8 is a flowchart showing one example of a procedure of measurement with the use of a measurement apparatus according to the present embodiment.

A procedure of measurement using measurement apparatuses 100A to 100F (hereinafter also collectively referred to as a "measurement apparatus 100") according to the present embodiment will now be described with reference to FIG. 8.

Initially, a user or a sample loading apparatus sets sample SMP (step S1). Then, measurement apparatus 100 adjusts a focus as will be described later (step S2). As a result of focus adjustment, a position of objective lens 12 relative to set sample SMP is determined.

By irradiating sample SMP with observation light from observation light source 34 as necessary, a target measurement position in sample SMP is adjusted. Specifically, irradiation of sample SMP with observation light from observation light source 34 is turned on (step S3). Then, the user or an auxiliary apparatus adjusts a position of sample SMP such that the target measurement position in sample SMP is irradiated with measurement light (step S4). When adjustment of the position is completed, irradiation of sample SMP with observation light from observation light source 34 is turned off (step S5). Then, measurement apparatus 100 adjusts again the focus as will be described later (step S6). As a result of focus adjustment, a position of objective lens 12 relative to the target measurement position in sample SMP is determined.

When the process above is completed, measurement with measurement apparatus 100 is started. Specifically, sample SMP is irradiated with measurement light from measurement light source 30 or measurement light source 32 and sample light is detected by spectroscope 60, so that a wavelength spectrum of reflected light from sample SMP is detected (step S7). Then, information processing apparatus 50 performs various types of numerical analysis processing based on a result of detection by spectroscope 60 (wavelength spectrum) (step S8), and outputs optical characteristics of sample SMP (step S9). Then, a series of processes ends.

When measurement at another measurement position in the same sample SMP is conducted, the processing in step S4 or later is repeated. The focus is adjusted (steps S2 and S6) and a position of sample SMP is adjusted (steps S3 to S5) as necessary, and the entirety or a part thereof does not have to be performed depending on a situation.

<I. Adjustment of Focus on Sample>

Adjustment of a focus of an objective lens on sample SMP will now be described. The measurement apparatus according to the present embodiment adjusts a focus based on an image of measurement light emitted to sample SMP. A pattern of measurement light itself is used for determining whether or not a focus is achieved.

(i1: Overview of Focus Adjustment)

Figure 9:
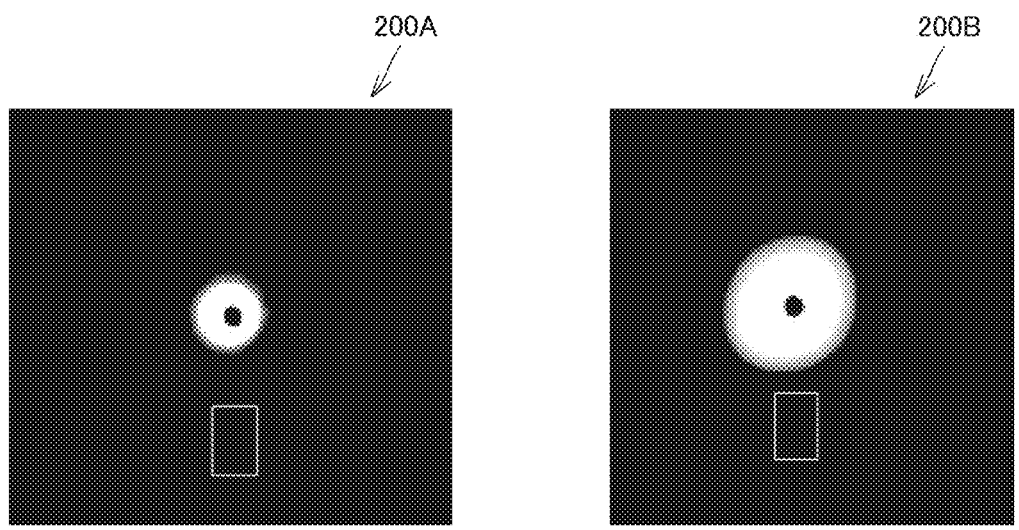
FIG. 9 is a diagram showing one example of a state of measurement light emitted to a sample from the measurement apparatus according to the present embodiment.

FIG. 9 is a diagram showing one example of a state of measurement light emitted to a sample from the measurement apparatus according to the present embodiment. FIG. 9 shows an image 200A corresponding to a state that an objective lens is focused on the sample and an image 200B corresponding to a state that the objective lens is out of focus on the sample.

It can be seen that a spot of emission by measurement light clearly appears in image 200A whereas the spot of emission by measurement light is blurred and spreads in image 200B. The measurement apparatus according to the present embodiment picks up an image of a state that the sample is irradiated with measurement light with the use of camera 28 and adjusts the focus based on sharpness of the picked up image. The measurement apparatus according to the present embodiment includes a control logic which determines a position of the objective lens relative to sample SMP with driving drive mechanism 54 based on sharpness of the image observed with camera 28. In the present embodiment, a contrast is employed as a value indicating a degree of focus (a focus value (FV)) by way of example of sharpness of an image.

Figure 10:
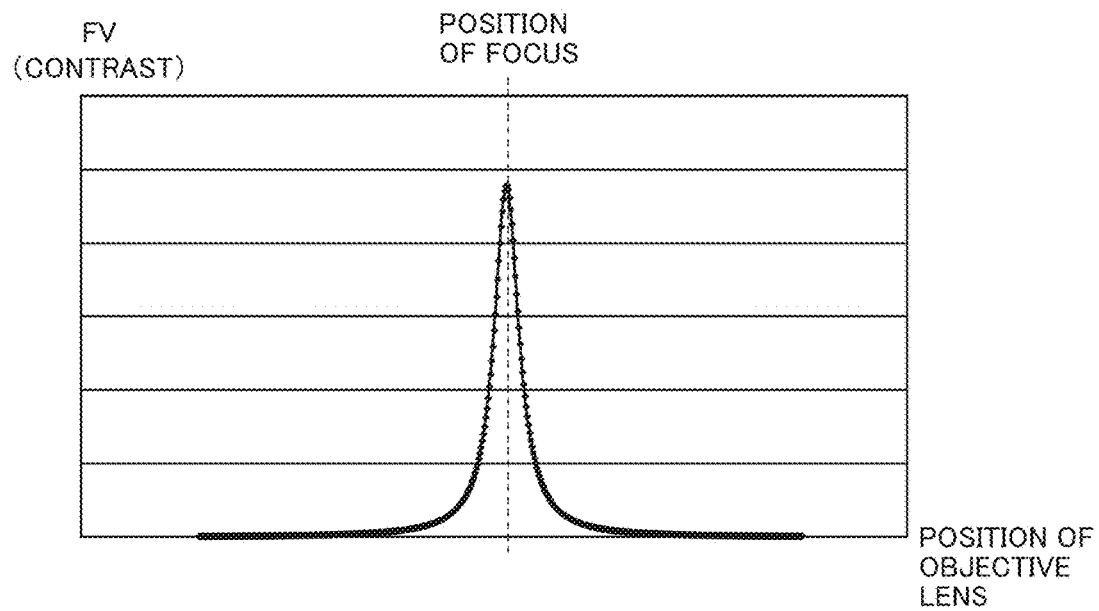
FIG. 10 is a diagram showing one example of relation between a position of an objective lens in the measurement apparatus according to the present embodiment and a contrast value.

FIG. 10 shows one example of relation between a position of the objective lens in the measurement apparatus according to the present embodiment and a contrast value. Referring to FIG. 10, an FV (a contrast) attains to a peak at a certain position by varying a position of the objective lens relative to sample SMP. The position at which the FV attains to the peak corresponds to a position where a focus is achieved (a focal position).

In the measurement apparatus according to the present embodiment, in order to complete focus adjustment in a shorter period of time, an image is obtained by picking up the image every prescribed period with the use of camera 28 while the objective lens is moved. Then, by calculating an FV of each obtained image, a profile of FVs with respect to positions of the objective lens as shown in FIG. 10 is obtained. By specifying a position where the FV attains to the peak in the obtained profile, a position of the objective lens is determined.

The peak position in the profile of the FVs can more accurately be determined by fitting the profile by using a predetermined function (for example, a Lorenzian peak function). Alternatively, with attention being paid only to the vicinity of the peak, the peak position can more accurately be determined by fitting using a quadratic. By thus using fitting, a focal position can accurately be determined without setting a fine pitch of image pick-up by camera 28. Even though a pitch of image pick-up by camera 28 is fine, variation in value is less around the peak and measurement accuracy may not be improved due to restriction on a signal to noise (S/N) ratio of camera 28. Even in such a case, determination of a peak position by using fitting is effective.

A speed at which the head portion including the objective lens is moved by drive mechanism 54 is set to be constant and camera 28 sufficiently high in speed of image pick-up with respect to a moving speed is adopted.

When a speed at which the objective lens is moved by drive mechanism 54 is high, a time period for transfer of an image obtained as a result of image pick-up by camera 28 and a time period for transfer required to obtain a position of drive mechanism 54 may be unignorable. Therefore, in order to achieve highly accurate focus adjustment, any of methods of adjusting the focus as shown below may be adopted.

(i2: Focus Adjustment Method (No. 1))

A focus adjustment method (No. 1) shows a processing procedure in focus adjustment based on exchange by information processing apparatus 50 with position controller 52 and camera 28.

Figure 11:
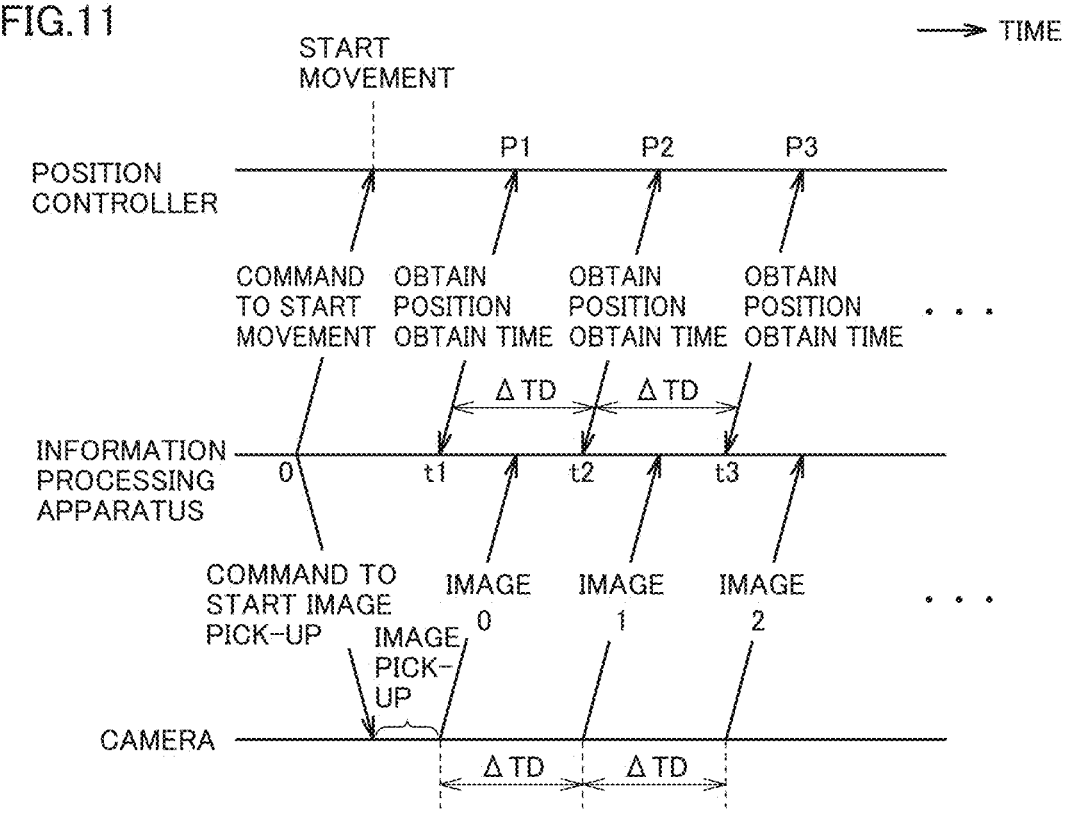
FIG. 11 is a time chart for illustrating a method (No. 1) of adjusting a focus in the measurement apparatus according to the present embodiment.
Figure 12:
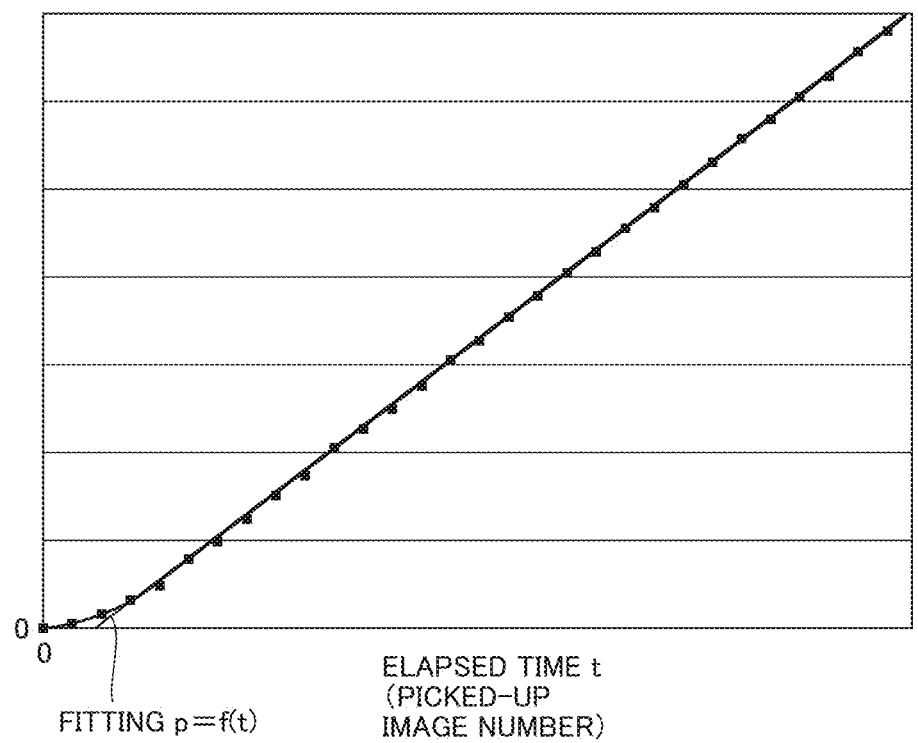
FIG. 12 is a diagram showing relation between an elapsed time and a position of an objective lens obtained in the method (No. 1) of adjusting a focus in the measurement apparatus according to the present embodiment.

FIG. 11 shows a time chart for illustrating the method (No. 1) of adjusting a focus in the measurement apparatus according to the present embodiment. FIG. 12 shows relation between an elapsed time and a position of the objective lens obtained in the method (No. 1) of adjusting a focus in the measurement apparatus according to the present embodiment.

Referring to FIG. 11, in the focus adjustment method (No. 1), information processing apparatus 50 gives a start trigger to both of position controller 52 and camera 28. At the reference time (zero), information processing apparatus 50 gives a command to start image pick-up to camera 28 and gives a command to start movement to position controller 52. The timing to start image pick-up by camera 28 and the timing to start movement under the control by position controller 52 thus match with each other. Information processing apparatus 50 holds the time at which it gave the command to start image pick-up as the reference time.

Upon receiving the command to start image pick-up, camera 28 performs an image pick-up operation every prescribed period (an image pick-up period ΔTD) and transfers the obtained image to information processing apparatus 50. With an image picked up in response to the command to start image pick-up being defined as an image 0, a subsequent image n is obtained at timing after lapse of an image pick-up period ΔTD×n since the reference time.

In order to obtain a position of the objective lens corresponding to the timing at which the image is obtained, information processing apparatus 50 obtains positional information from position controller 52 in correspondence with a period of image pick-up by camera 28. Since delay is caused in obtained positional information due to a time period for transfer, information processing apparatus 50 successively stores the time at which positional information is requested (a time period elapsed since the reference time) and the obtained positional information in association with each other. Relation between the time and the positional information is determined by fitting a set of the obtained time and the positional information by using a linear function.

FIG. 12 shows one example of a result of fitting, and a relational expression p=f(t) between an elapsed time t since the reference time and a position p of the objective lens can be determined.

A peak on the profile of the FVs calculated from the images obtained with camera 28 is searched for, and the time of pick-up of the image including the found peak (a time period elapsed since the reference time) is determined. A position of the objective lens can be determined by inputting determined time tin the result of fitting. Alternatively, the number of picked up images (number) may be used instead of time t. In other words, the relational expression after fitting shown in FIG. 12 indicates a position of the objective lens at each image pick-up timing.

Through such a procedure, highly accurate focus adjustment can be achieved.

Figure 13:
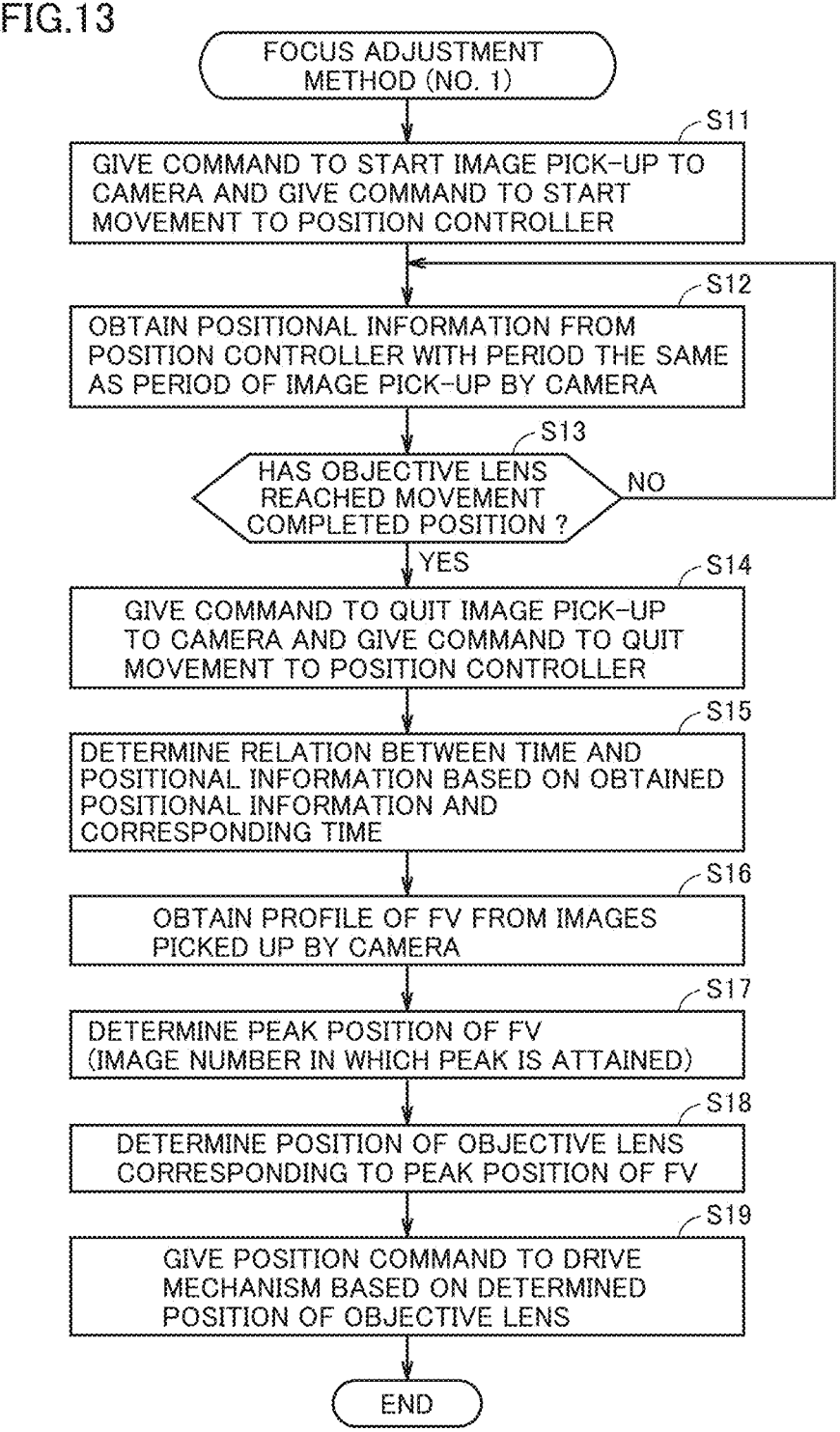
FIG. 13 is a flowchart showing a processing procedure in the method (No. 1) of adjusting a focus in the measurement apparatus according to the present embodiment.

FIG. 13 shows a flowchart showing a processing procedure in the method (No. 1) of adjusting a focus in the measurement apparatus according to the present embodiment. The processing procedure shown in FIG. 13 corresponds to more detailed contents in step S2 and step S6 shown in FIG. 8.

Referring to FIG. 13, when focus adjustment is indicated, information processing apparatus 50 gives a command to start image pick-up to camera 28 and gives a command to start movement to position controller 52 (step S11). Then, camera 28 repeatedly picks up an image with a prescribed period of image pick-up. Drive mechanism 54 starts movement of the objective lens at a prescribed moving speed.

Information processing apparatus 50 repeats obtainment of positional information from position controller 52 with a period the same as the period of image pick-up by camera 28 (step S12). Here, information processing apparatus 50 stores the obtained positional information in correspondence with time at which it requested position controller 52 of positional information. Obtainment of positional information from position controller 52 is repeated until the objective lens reaches a movement completed position (NO in step S13).

When the objective lens reached the movement completed position (YES in step S13), information processing apparatus 50 gives a command to quit image pick-up to camera 28 and gives a command to quit movement to position controller 52 (step S14).

Information processing apparatus 50 determines relation between time and positional information as shown in FIG. 12 based on the positional information obtained in step S12 and the corresponding time (step S15). Then, information processing apparatus 50 calculates FVs (contrasts) of respective images picked up by camera 28 in step S12 and obtains the profile of the FVs (step S16). Then, the information processing apparatus performs fitting processing on the profile of the FVs and determines a peak position of the FV (an image number in which the peak is attained) (step S17). Furthermore, information processing apparatus 50 determines a position of the objective lens corresponding to the peak position of the FV determined in step S17 by referring to relation between the time and the positional information determined in step S15 (step S18). Finally, information processing apparatus 50 gives a position command to drive mechanism 54 based on the position of the objective lens determined in step S18 (step S19).

Adjustment of the focus of the objective lens is completed through the processing procedure as above.

(i3: Focus Adjustment Method (No. 2))

Though a configuration example in which information processing apparatus 50 gives respective commands to camera 28 and position controller 52 has been shown in connection with the focus adjustment method (No. 1) described above, a more accurate image pick-up position may be controlled by associating position controller 52 and camera 28 with each other.

In a focus adjustment method (No. 2), a trigger line for giving an image pick-up command from position controller 52 to camera 28 is provided. Position controller 52 gives a trigger for image pick-up to camera 28 every prescribed amount of movement. An image picked up by camera 28 and a position of the corresponding objective lens can thus more accurately be associated with each other. Accuracy in focus can thus be improved.

Figure 14:
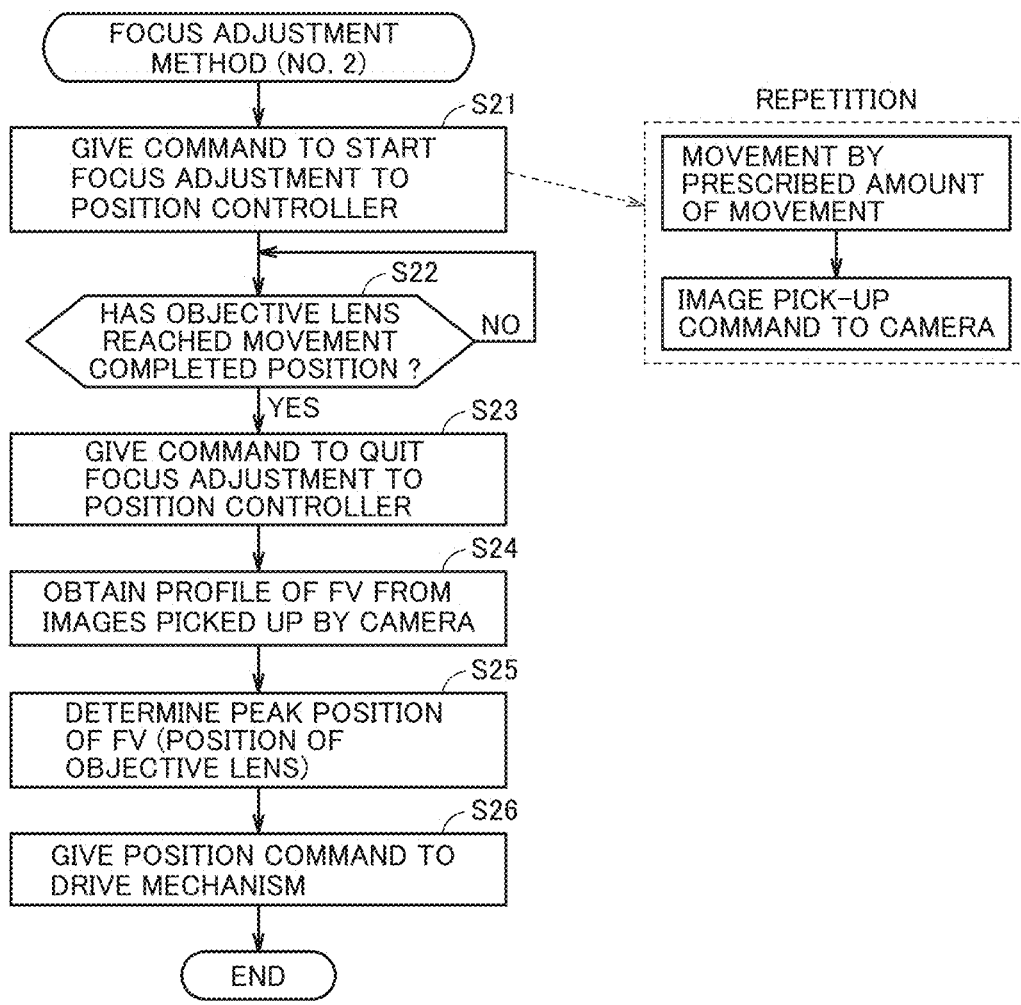
FIG. 14 is a flowchart showing a processing procedure in a method (No. 2) of adjusting a focus in the measurement apparatus according to the present embodiment.

FIG. 14 shows a flowchart showing a processing procedure in the method (No. 2) of adjusting a focus in the measurement apparatus according to the present embodiment. The processing procedure shown in FIG. 14 corresponds to more detailed contents in step S2 and step S6 shown in FIG. 8.

Referring to FIG. 14, when focus adjustment is indicated, information processing apparatus 50 gives a command to start focus adjustment to position controller 52 (step S21). Then, drive mechanism 54 starts movement of the objective lens at a prescribed moving speed and gives an image pick-up command to camera 28 every prescribed amount of movement.

When the objective lens reached a movement completed position (YES in step S22), information processing apparatus 50 gives a command to quit focus adjustment to position controller 52 (step S23).

Information processing apparatus 50 calculates FVs (contrasts) of respective images picked up by camera 28 in step S21 and obtains a profile of the FVs in association with positions corresponding to respective images (step S24). Then, the information processing apparatus performs fitting processing on the profile of the FVs and determines a peak position of the FV (a position of the objective lens) (step S25). Furthermore, information processing apparatus 50 gives a position command to drive mechanism 54 based on the position of the objective lens determined in step S25 (step S26).

Adjustment of the focus of the objective lens is completed through the processing procedure as above.

(i4: Search Procedure)

Search for a focal position through focus adjustment may be completed by carrying out search once. For improved accuracy, however, search may be carried out a plurality of times. Processing in search for a focal position a plurality of times will be described.

Figure 15:
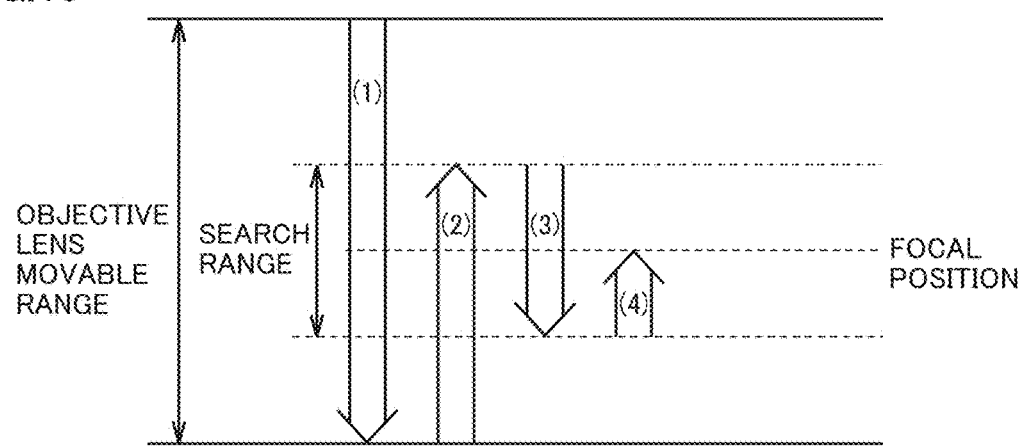
FIG. 15 is a schematic diagram for illustrating a procedure for searching for a focal position in the measurement apparatus according to the present embodiment.

FIG. 15 shows a schematic diagram for illustrating a procedure for searching for a focal position in the measurement apparatus according to the present embodiment. A focal position is preferably searched for from a region far from sample SMP toward the sample in consideration of an operating distance of objective lens 12 from sample SMP. Referring to FIG. 15, in the first search for a focal position, the objective lens moves from a position most distant from sample SMP in a direction toward the sample, the objective lens passes a position where a focal position is estimated to be present, and the objective lens stops after the objective lens has sufficiently moved after the passage. A range of second movement is determined based on a profile of FVs obtained in the first search. Specifically, a range up to a position distant from sample SMP to some extent is determined as a search range, with the peak position determined in the first search being defined as the reference. Then, the second search is carried out. In the second search, an image is picked up with a moving speed of the objective lens being lower, that is, an interval of image pick-up being shorter, than in the first search. A range of third movement is then determined based on a profile of FVs obtained in the second search. A focal position is determined by repeating a similar procedure prescribed times or until a predetermined condition is satisfied.

<J. Method of Adjusting Optical Path>

In the measurement apparatus according to the present embodiment, an optical path from the objective lens to the spectroscope serving as the light reception portion should accurately be adjusted. A method of adjusting the optical path will be described below.

Figure 16:
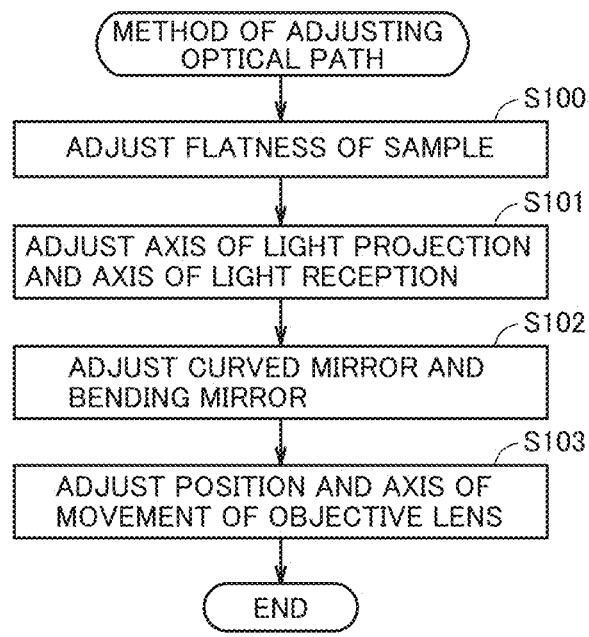
FIG. 16 is a flowchart showing a procedure for adjusting an optical path in the measurement apparatus according to the present embodiment.

FIG. 16 is a flowchart showing a procedure for adjusting an optical path in the measurement apparatus according to the present embodiment. FIG. 16 shows a procedure for adjusting an optical component constituting measurement apparatus 100D shown in FIG. 5.

Referring to FIG. 16, initially, flatness of sample SMP is adjusted (step S100). Specifically, beam splitter 22 is set at an initial position, light from laser for adjustment is incident on beam splitter 22, and the light is projected onto a position where sample SMP is arranged. Flatness of the position where sample SMP is arranged is adjusted based on this state of projection.

In succession, an axis of light projection and an axis of light reception are adjusted (step S101). Specifically, light from laser for adjustment is incident from each of a light source side and a spectroscope side on beam splitter 22 set at the initial position, and each optical path is adjusted such that light is incident on the same position in sample SMP.

In succession, curved mirror 20 and bending mirror 21 are adjusted (step S102). Specifically, light from laser for adjustment is incident on beam splitter 22, and an angle and a position of curved mirror 20 and bending mirror 21 are adjusted such that the light is projected on a prescribed position in sample SMP.

Finally, a position and an axis of movement of the objective lens are adjusted (step S103). Specifically, light from laser for adjustment is incident on beam splitter 22, and a position and an angle of the axis of movement of the objective lens are adjusted such that a position of projection of the light on sample SMP is not varied in spite of movement of the objective lens.

Through the procedure above, an optical path more appropriate for the optical component of the measurement apparatus can be set up.

<K. Confirmation of Effect>

The measurement apparatus according to the present embodiment can adjust the focus on sample SMP simply by moving the head portion including the objective lens. A result confirmed through experiments of an effect of focus adjustment by movement of the head portion is shown below. The result of experiments shown below is obtained by using measurement apparatus 100D shown in FIG. 5.

Figure 17:
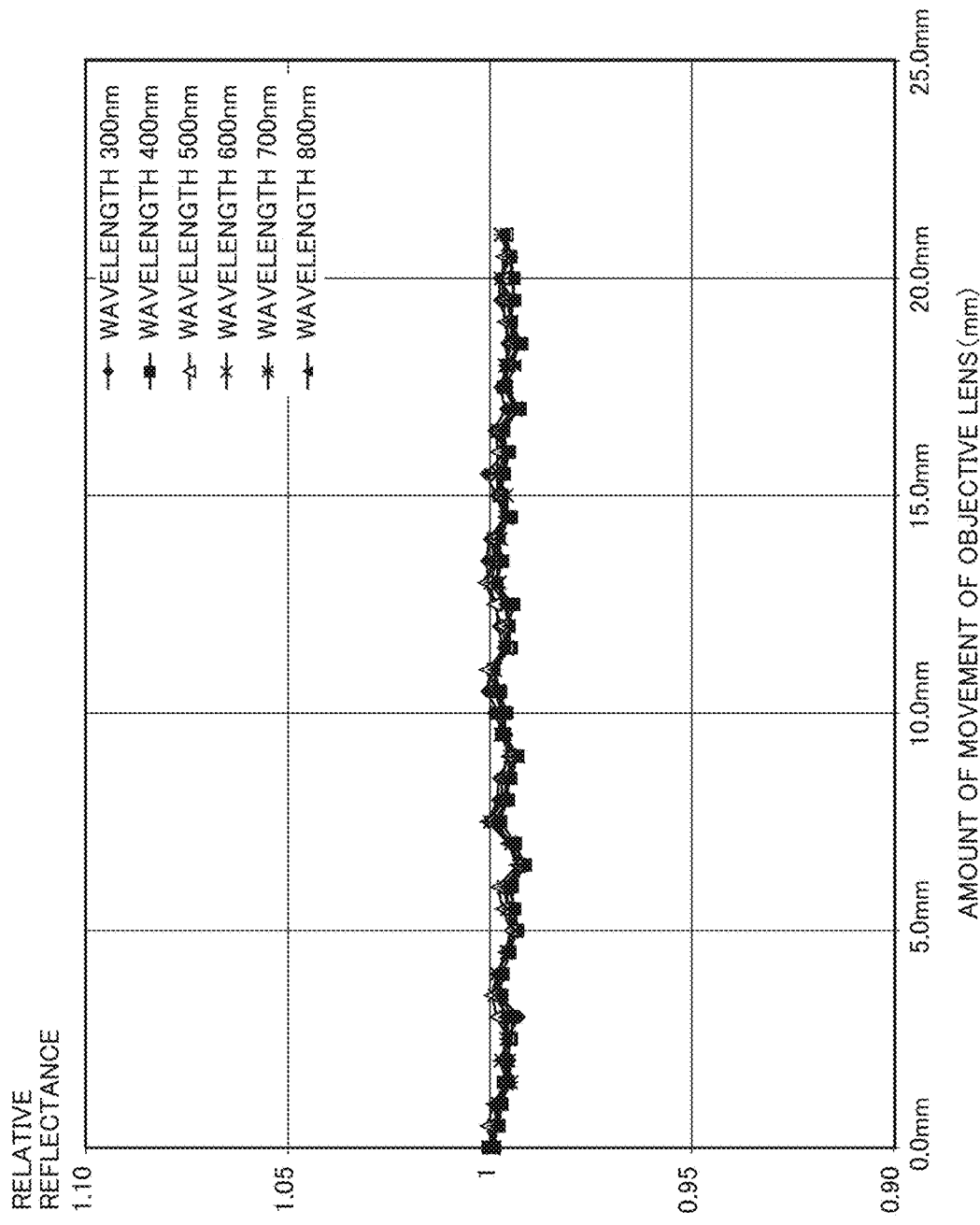
FIG. 17 shows an example of a result of measurement of a relative reflectance for each wavelength obtained with a position of the objective lens in the measurement apparatus according to the present embodiment being varied to a plurality of positions.

FIG. 17 shows an example of a result of measurement of a relative reflectance for each wavelength obtained with a position of the objective lens in the measurement apparatus according to the present embodiment being varied to a plurality of positions. Measurement was conducted with a height of sample SMP being also varied in correspondence with variation in position of the objective lens. A relative reflectance was measured at 6 wavelengths in total, every 100 nm from 300 nm to 800 nm.

According to the example of the result of measurement shown in FIG. 17, substantially the same relative reflectance was exhibited at any wavelength without being affected by the position of the objective lens. This result shows that focus adjustment and a result of measurement are less likely to be affected even though a relative distance from sample SMP is varied in focus adjustment based on movement of the head portion including the objective lens.

Figure 18:
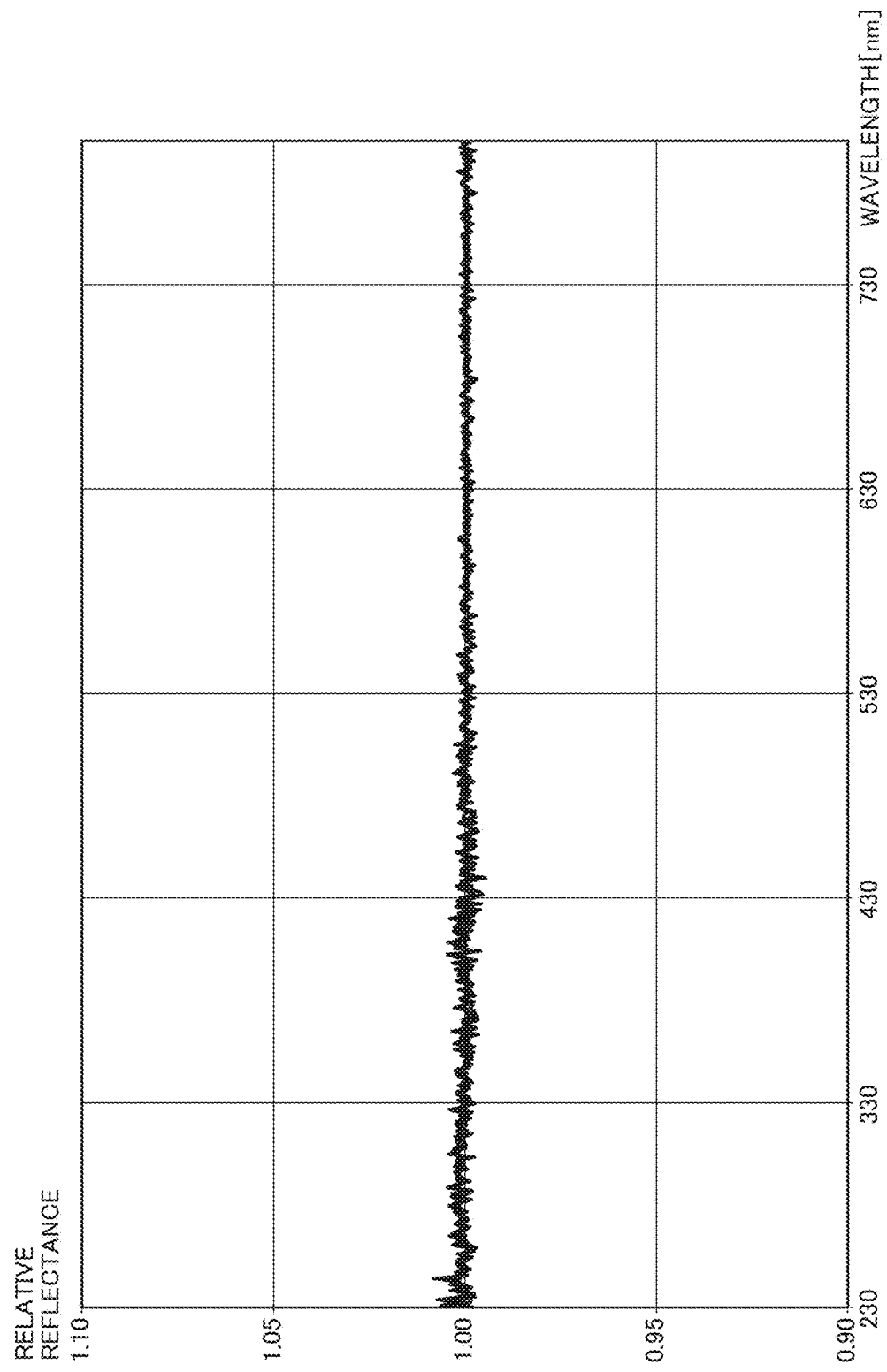
FIG. 18 shows an example of a result of measurement of a reflectance spectrum measured after the focus is adjusted in the measurement apparatus according to the present embodiment.

FIG. 18 shows an example of a result of measurement of a reflectance spectrum measured after focus adjustment in the measurement apparatus according to the present embodiment. FIG. 18 shows a reflectance spectrum obtained each time the focus was adjusted, with the focus having been adjusted five times.

According to the example of the result of measurement shown in FIG. 18, it can be seen that highly accurate focus adjustment was achieved in any focus adjustment and measurement was stable over a wide wavelength range.

<L. Advantages>

The measurement apparatus according to the present embodiment adopts a new optical system constituted of a combination of an objective lens which converts measurement light from a sample to parallel light and a reflective lens which reflects the parallel light from the objective lens to convert the parallel light to convergent light. By moving the objective lens along an optical axis of the parallel light, the focus on the sample can be adjusted.

Therefore, even when a relatively large sample should be measured, it is not necessary to move the sample. A microscopic optical system which can adjust the focus simply by moving the objective lens can be realized. A focusing mechanism including an objective lens and a drive mechanism therefor can also be packaged as a head portion. By adopting such a head portion, the apparatus can be reduced in size. Such a head portion can readily be combined with another optical unit or measurement unit and thus extensibility can be enhanced.

In the measurement apparatus according to the present embodiment, both of the objective lens and the reflective lens can be implemented only by a reflective optical system, and in this case, influence by chromatic aberration can substantially be ignored. Even when a refractive lens is adopted only for the objective lens, influence by chromatic aberration can significantly be suppressed as compared with a conventional configuration.

Therefore, since an optical path from the sample to the light reception portion is made up by a reflection optical system, optical characteristics can be measured through measurement of a spectrum over a wide wavelength range including the ultraviolet band, the visible light band, and the infrared band and numerical analysis of the measured spectrum substantially without influence by chromatic aberration. Therefore, various optical characteristics can be measured and versatility can be enhanced.

The measurement apparatus according to the present embodiment includes a reflective lens as an imaging lens and can include a bending mirror on an optical path from the reflective lens to the imaging lens. By adopting such a bending mirror, components can three-dimensionally be arranged and the apparatus can further readily be reduced in size.

The measurement apparatus according to the present embodiment can also include a reflective objective lens. Since the reflective objective lens is free from chromatic aberration in both of the objective lens and the imaging lens in spite of its simplified configuration, accuracy in measurement can further be enhanced.

By adopting a Cassegrainian reflective objective lens as the reflective objective lens, a reflective optical system advantageous in high magnification, compactness, and long operating distance can be realized. Alternatively, by adopting an off-axis reflective objective lens constituted of a combination of a curved mirror and a bending mirror as the reflective objective lens, a reflective optical system with a simplified configuration advantageous in low magnification, long operating distance, and great depth of focus can be realized.

Since the measurement apparatus according to the present embodiment can adjust the focus based on a pattern (an image) of measurement light itself, a focused state of measurement light used for actual measurement can reliably be confirmed. Since it is not necessary to project a reticle pattern as in the conventional configuration, a field of view in observation is not blocked.

Since the focus is adjusted based on sharpness (contrast) of a pattern (an image) of measurement light itself, more accurate focus adjustment can be achieved while a relatively simplified configuration is maintained.

The measurement apparatus according to the present embodiment can search for a focusing position by successively obtaining patterns (images) of measurement light itself while a position of the objective lens is varied. Since an algorithm which can correct some delay, if any, in transfer of an image from the camera is adopted, a focusing position can highly accurately be determined. Since a peak included in a profile of FVs is determined with fitting, an accurate peak position can be specified even though any disturbance is caused.

The measurement apparatus according to the present embodiment can switch between measurement light narrow in field of view and observation light wide in field of view which are output through an aperture, by providing a switching mirror. By switching between measurement light and observation light, accurate measurement and obtainment of an observed image wide in range of a field of view can both be achieved.

By selectively using light sources which produce measurement light, any of a state that measurement light is focused on the sample and a state that a focusing position of measurement light is sufficiently distant from the sample (sufficiently out of focus) can be realized. Thus, measurement light can be emitted in a state more suitable for characteristics of the sample and hence more appropriate measurement can be conducted without being affected by a state of focus.

The description above will clarify other advantages of the optical characteristic measurement apparatus and the optical system according to the present embodiment.

Though the embodiments of the present invention have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. An optical characteristic measurement apparatus comprising:
   a movable first optical element including at least one curved optic positioned to receive diverging measurement light from a measurement target object and to transmit or reflect the received measurement light as parallel light;
   a reflective lens, comprising a curved mirror, configured to reflect the parallel light from the movable first optical element to convert the parallel light to convergent light;
   a second optical element, including at least one mirror, arranged on an optical path between the movable first optical element and the reflective lens, the at least one mirror positioned to reflect the parallel light from the movable first optical element to vary a direction of propagation of the parallel light;
   a spectroscope configured to receive the convergent light from the reflective lens;
   an actuator coupled to the movable first optical element, the actuator operable to vary a position of the movable first optical element relative to the measurement target object;
   a first light source configured to produce measurement light for irradiation of the measurement target object; and
   a beam splitter which is arranged on an optical path from the reflective lens to the spectroscope and is optically connected to the first light source.

2. The optical characteristic measurement apparatus according to claim 1, wherein
the at least one curved optic of the movable first optical element comprises a set of a convex reflector and a concave reflector which are arranged such that central axes of the reflectors match with an optical axis of the parallel light.

3. The optical characteristic measurement apparatus according to claim 1, wherein
the at least one curved optic of the movable first optical element comprises a curved mirror arranged in correspondence with the reflective lens and a bending mirror combined with the curved mirror.

4. The optical characteristic measurement apparatus according to claim 1, wherein
the spectroscope is configured to output a wavelength spectrum included in light received from the reflective lens.

5. The optical characteristic measurement apparatus according to claim 1, the optical characteristic measurement apparatus further comprising a second light source configured to produce observation light including at least a visible light band in a wavelength component, wherein
the first light source produces the measurement light including a wavelength component in accordance with optical characteristics to be measured from the measurement target object.

6. The optical characteristic measurement apparatus according to claim 5, the optical characteristic measurement apparatus further comprising a camera configured to observe an image of the measurement light emitted to the measurement target object.

7. The optical characteristic measurement apparatus according to claim 6, the optical characteristic measurement apparatus further comprising a controller configured to determine a position of the at least one curved optic of the movable first optical element relative to the measurement target object by operating the actuator based on sharpness of the image observed with the camera.

* * * * *